Dec. 24, 1940.  C. BLUESTONE  2,226,422
DEPOSITORY BOOK
Filed July 24, 1939  2 Sheets-Sheet 1

INVENTOR
CHARLES BLUESTONE
BY
ATTORNEY

Dec. 24, 1940.   C. BLUESTONE   2,226,422
DEPOSITORY BOOK
Filed July 24, 1939   2 Sheets-Sheet 2

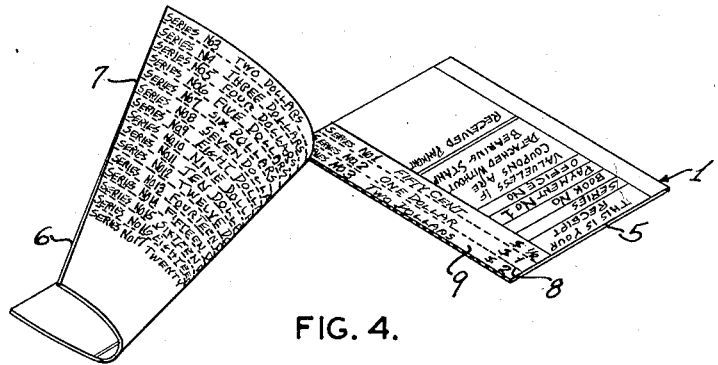

FIG. 4.

| THIS IS YOUR RECEIPT | SERIES | BOOK NO. | PAYMENT NO. 2 | OFFICE NO. | VALUELESS IF COUPONS ARE DETACHED WITHOUT BEARING STAMP | RECEIVED PAYMENT |
|---|---|---|---|---|---|---|
| SERIES NO.1 | ONE DOLLAR | | | | | S 1 |
| SERIES NO.2 | TWO DOLLARS | | | | | S 2 |
| SERIES NO.3 | FOUR DOLLARS | | | | | S 4 |
| SERIES NO.4 | SIX DOLLARS | | | | | S 6 |
| SERIES NO.5 | EIGHT DOLLARS | | | | | S 8 |
| SERIES NO.6 | TEN DOLLARS | | | | | S 10 |
| SERIES NO.7 | TWELVE DOLLARS | | | | | S 12 |
| SERIES NO.8 | FOURTEEN DOLLARS | | | | | S 14 |
| SERIES NO.9 | SIXTEEN DOLLARS | | | | | S 16 |
| SERIES NO.10 | EIGHTEEN DOLLARS | | | | | S 18 |
| SERIES NO.11 | TWENTY DOLLARS | | | | | S 20 |
| SERIES NO.12 | TWENTYFOUR DOLLARS | | | | | S 24 |
| SERIES NO.13 | TWENTYEIGHT DOLLARS | | | | | S 28 |
| SERIES NO.14 | THIRTY DOLLARS | | | | | S 30 |
| SERIES NO.15 | THIRTYFOUR DOLLARS | | | | | S 34 |
| SERIES NO.16 | THIRTYSIX DOLLARS | | | | | S 36 |
| SERIES NO.17 | FORTY DOLLARS | | | | | S 40 |
| AGENT'S STUB | SERIES | BOOK NO. | PAYMENT NO. 2 | OFFICE NO. | RETURN THIS STUB & CANCELLED COUPONS WITH YOUR REPORS TO AUDITOR | RECEIVED PAYMENT |

FIG. 5.

| SERIES NO.1 | ONE DOLLAR | S 1 |
|---|---|---|
| SERIES NO.2 | TWO DOLLARS | S 2 |
| SERIES NO.3 | FOUR DOLLARS | S 4 |
| SERIES NO.4 | SIX DOLLARS | S 6 |
| SERIES NO.5 | EIGHT DOLLARS | S 8 |
| SERIES NO.6 | TEN DOLLARS | S 10 |
| SERIES NO.7 | TWELVE DOLLARS | S 12 |
| SERIES NO.8 | FOURTEEN DOLLARS | S 14 |
| SERIES NO.9 | SIXTEEN DOLLARS | S 16 |
| SERIES NO.10 | EIGHTEEN DOLLARS | S 18 |
| SERIES NO.11 | TWENTY DOLLARS | S 20 |
| SERIES NO.12 | TWENTYFOUR DOLLARS | S 24 |
| SERIES NO.13 | TWENTYEIGHT DOLLARS | S 28 |
| SERIES NO.14 | THIRTY DOLLARS | S 30 |
| SERIES NO.15 | THIRTYFOUR DOLLARS | S 34 |
| SERIES NO.16 | THIRTYSIX DOLLARS | S 36 |
| SERIES NO.17 | FORTY DOLLARS | S 40 |

FIG. 6.

INVENTOR
CHARLES BLUESTONE
BY
ATTORNEY

Patented Dec. 24, 1940

2,226,422

UNITED STATES PATENT OFFICE 2,226,422

DEPOSITORY BOOK

Charles Bluestone, University City, Mo.

Application July 24, 1939, Serial No. 286,064

2 Claims. (Cl. 283—52)

This invention relates generally to depository books and, more particularly, to a certain new and useful improvement in such books of the coupon depository type, with specific regard to an economic method whereby, by budgeting one's income, an individual may systematically save a self-specified portion for enabling the payment at a self-designated time, for instance, of the cost of whatever travel, foreign or domestic, recreational, educational, commercial, or independent, such as escorted and sightseeing tours, cruises, and the like, he or she may desire.

My invention hence has for its primary objects the provision of a book of the type stated which may facilely be so manipulated in use as to preserve a continuing and progressive record of the successive transactions between the customer and the depository, which is simple and economical in form and structure, which cannot readily be falsified or otherwise subjected to fraudulent use, which automatically preserves an effective receipt both for the customer and the depository, and which is highly efficient in the performance of its stated functions.

And with the above and other objects in view, my invention resides in the novel features of form, construction, arrangement, and combination of parts presently described and pointed out in the claims.

In the accompanying drawings (two sheets):

Figure 4 is a perspective view of a partially severed or torn coupon or page, illustrating the interrelation of the front and rear faces of the several respective pages or coupons; and Figures 5 and 6 are obverse and reverse views, respectively, of the second coupon or page of the book.

Figures 1, 2, 3:
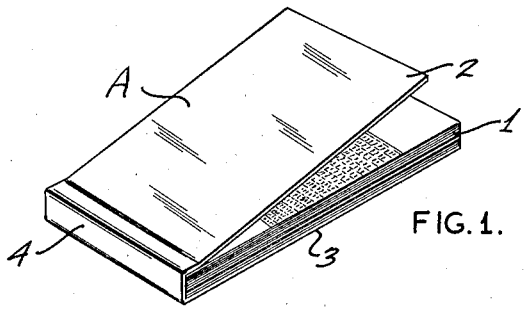
Figure 1 is a reduced perspective view of a coupon depository book embodying my present invention.
Figures 2 and 3 are obverse and reverse views, respectively, of the first so-called coupon or page of the book.

Referring now in more detail and by reference characters to the drawings, A designates generally a so-called coupon or budget book embodying my invention in preferred form, which book includes a plurality of identically shaped overlying flexible leaves or pages 1 stapled or otherwise marginally fixed to and housed within correspondingly sized front and rear covers 2, 3, preferably integrally joined or connected by a back 4.

Each leaf 1 is subdivided into a so-called receipt-stub 5, a record-providing end panel 6, and an intermediate or central panel 7, in turn, transversely subdivided by a plurality of spaced parallel lines of weakness 8, into a series of sum-designating tear-sections or coupons 9.

On the stub 5 and end panel 6, respectively, is imprinted and displayed suitable indicia and wording descriptive preferably of the nature of the book A, the serial number thereof, and such other information and data as may be desirable, as more or less shown in Figures 2 and 5.

The coupons 9 are preferably numbered consecutively, on the front face of the respective panels 7, from 1 to 17, both inclusive, the No. 1 coupon being adjacent the stub 5 and the No. 17 coupon being correspondingly adjacent the end-panel 6.

The coupons 9 of the several successive panels 7 display selected monetary values or sums. Accordingly, in the present instance, the coupons 9 on the first leaf or sheet 1 are imprinted with and display amounts or sums from a unit value of $.50 to succeeding multiples thereof to $20.00 in the series as shown in Figure 1. The second sheet or leaf 1 is similarly imprinted with and display values or amounts from a unit multiple of $1.00 to a unit multiple of $40.00 in the series as shown in Figure 5. Thus, the series No. 1 coupon on each successive leaf 1 will show and have a value of an amount 50¢ greater than the corresponding coupon of the preceding leaf or sheet. It will, of course, be obvious and understood that the numerical arrangement and denomination of the various coupons may be varied to suit the particular purpose for which the book is to be used.

On the reverse side, each of the leaves 1 is preferably blank, except for the coupons 9, which are imprinted substantially as shown in Figures 3 and 6. It should be noted, however, that the reverse side of the No. 1 coupon is blank and that the reverse side of the No. 2 coupon carries and displays the same wording as the obverse side of the No. 1 coupon of the particular page or leaf. Similarly the reverse side of the No. 17 coupon carries and displays the same wording as the obverse side of the No. 16 coupon of such page or leaf. Finally, the reverse side of the end panel 6 of said particular leaf is imprinted with and displays adjacent the outer line of weakness 8 with the same wording as the No. 17 coupon.

For example, if it be assumed that the budgeteer desires to save fifty cents a week, he will select coupon series No. 1, and upon depositing the initial sum of fifty cents, the first leaf 1 is severed along the first line of weakness 8, leaving an initial stub 5 with the No. 1 coupon thereto attached. The detached portion of such leaf 1 will be retained by a teller or clerk of the depository and will display on its reverse side the same amount, namely, $.50, on its first or No. 1 coupon. Preferably the teller of the depository will stamp both the stub 5 and the end panel 6, showing the deposit and thus preserving duplicate receipts of the transaction.

At the time of the second deposit, the next succeeding leaf 1 is severed along a line 8 so as to leave the No. 1 coupon thereof attached to the stub 5 as before to indicate that the total sum of $1.00 has been deposited to date. Again, on the reverse side of the detached portion of such leaf, the attached first or No. 1 coupon will also indicate that the total amount of $1.00 has been deposited to date.

If, on the other hand, the budgeteer, for instance, desires to make deposits in units of $6.00, he would select coupon series No. 7, and the several leaves 1 would then each be severed along the line of weakness intermediate coupons No. 7 and No. 8.

In such manner, the budgeteer may build up, by regular, systematic deposits, the total sum desired for any specific purpose, both the budgeteer and the depository having quickly at hand complementary receipts for respective deposits.

It will be evident that the book A of my present invention may be readily employed for a wide range of savings plans and without necessitating a multiplicity of books of different denominations. In addition, the book A is relatively fraud-proof, since the stubs 5 retained in the book by the budgeteer or customer can only be altered through the removal of attached coupons, and such action would only result in lowering, rather than raising, the total of deposits or other such value of the book. Similarly, the detached leaf-portion or end panel 6 retained by the teller can only be altered through the removal of coupons, and such action would merely increase the amount for which the teller or depository representative would have to account. By reason of the fact that the reverse side of the detached portion displays the precise amount corresponding to the budgeteer's or customer's stub 5, mistakes and clerical errors are avoided.

This unique book, and the economic and commercial activities which will result from its use, pertains particularly to financial organizations, such as banks, insurance companies, and like institutions, and business organizations which may avail themselves of the book, especially banks which do not operate a budget-plan savings account nor offer patrons service of an independent travel bureau which will provide a separate and distinct service department, an invaluable patron service.

It should be understood that changes and modifications in the form, construction, arrangement, and combination of the several parts of the book may be made and substituted for those herein shown and described without departing from the nature and principle of my invention.

Having thus described my invention, what I claim and desire to secure by Letters Patent is:

1. A deposit-book comprising a plurality of elongated leaves collectively and permanently bound at one edge between covers and having their bound and free edges printed as receipt and collection coupons and the leaves being numerically successively designated on both of said coupons from front to back of the book, each of said leaves in the middle portion intermediate the collection and receipt coupons being provided with a plurality of spaced and transversely extending lines of severance thus subdividing the leaf into a series of separable monetary value indicating coupons with the coupons on the first leaf consecutively displaying increasing selected monetary values upon the front faces thereof and the succeeding leaves of the book having the tear-off separable coupons thereof successively displaying monetary values being substantially the multiple of the monetary value on each of the coupons of the first leaf when taken with the particular leaf designating member whereby when the first leaf is severed at a particular intermediate coupon severance of successive leaves along a corresponding line will give both collection and receipt indications of a total being the multiple of the particular leaf and the collected monetary value on the first leaf with both the collection and receipt coupon portions being of substantially equal length for the several severed leaves.

2. A deposit-book comprising a plurality of elongated leaves collectively and permanently bound at one edge between covers and having their bound and free edges printed as receipt and collection coupons and the leaves being numerically successively designated on both of said coupons from front to back of the book, each of said leaves in the middle portion intermediate the collection and receipt coupons being provided with a plurality of spaced and transversely extending lines of severance thus subdividing the leaf into a series of separable monetary value indicating coupons with the coupons on the first leaf consecutively displaying increasing selected monetary values upon the front faces thereof and the succeeding leaves of the book having the tear-off separable coupons thereof successively displaying monetary values being substantially the multiple of the monetary value on each of the coupons of the first leaf when taken with the particular leaf designating member whereby when the first leaf is severed at a particular intermediate coupon severance of successive leaves along a corresponding line will give both collection and receipt indications of a total being the multiple of the particular leaf and the collected monetary value on the first leaf with both the collection and receipt coupon portions being of substantially equal length for the several severed leaves, the first of the intermediate coupons of each leaf being devoid of monetary value designation on its reverse face and the remainder of said intermediate coupons displaying on their reverse faces increase in selected monetary values corresponding to the monetary values on the front faces of the intermediate coupons of each leaf with the showing of the monetary values on the reverse sides being started and continuing on beyond the said first intermediate coupon.

CHARLES BLUESTONE.